United States Patent
Numata

[11] Patent Number: 5,243,877
[45] Date of Patent: Sep. 14, 1993

[54] STEERING WHEEL RIM

[76] Inventor: Ryusaku Numata, P.O. Box 272, Patchogue, N.Y. 11712

[21] Appl. No.: 915,252

[22] Filed: Jul. 20, 1992

Related U.S. Application Data

[63] Continuation-in-part of Ser. No. 855,441, Mar. 30, 1992.

[51] Int. Cl.$^5$ .................................................. B62D 1/04
[52] U.S. Cl. .................................... 74/552; 280/731
[58] Field of Search ............... 74/552, 558; 280/731, 280/750

[56] References Cited

U.S. PATENT DOCUMENTS

| | | | |
|---|---|---|---|
| 1,056,873 | 3/1913 | Wirt | 74/552 |
| 1,220,878 | 3/1917 | Morgan . | |
| 1,713,035 | 5/1929 | Dover . | |
| 2,818,749 | 1/1958 | Bayko | 74/552 |
| 2,863,015 | 12/1958 | Ahrens | 74/552 |
| 3,671,056 | 6/1972 | Windemuth | 280/47.32 |
| 3,726,672 | 4/1973 | Lindberg et al. | 75/142 |
| 3,856,360 | 12/1974 | Lindberg et al. | 301/65 |
| 4,421,193 | 12/1983 | Bissett | 180/192 |
| 4,426,951 | 1/1984 | Nishizima | 116/46 |
| 4,462,961 | 7/1984 | Ito et al. | 420/534 |
| 4,527,839 | 7/1985 | Fujitaka et al. | 301/63 DD |
| 4,590,340 | 5/1986 | Koike et al. | 200/61.54 |
| 4,631,976 | 12/1986 | Noda et al. | 74/552 |
| 4,645,223 | 2/1987 | Grossman | 280/11.28 |
| 4,662,238 | 5/1987 | Zeller | 74/552 |
| 4,664,644 | 5/1987 | Kumata et al. | 464/180 |
| 4,702,527 | 10/1987 | Kawano | 301/9 DN |
| 4,714,588 | 12/1987 | Huet | 420/534 |
| 4,741,223 | 5/1988 | Kondo et al. | 74/552 |
| 4,770,850 | 9/1988 | Hehmann et al. | 420/402 |
| 4,892,006 | 1/1990 | Endo et al. | 74/552 |
| 4,898,429 | 2/1990 | Plumer | 301/9 DN |
| 4,920,821 | 5/1990 | Shinto et al. | 74/552 |
| 4,920,822 | 5/1990 | Abiko | 74/558 |
| 4,921,267 | 5/1990 | Kirk | 280/281.1 |
| 4,946,647 | 8/1990 | Rohatgi et al. | 420/528 |
| 4,962,947 | 10/1990 | Nagata et al. | 74/552 |
| 4,975,235 | 12/1990 | Henigue | 74/552 X |
| 5,040,646 | 8/1991 | Drefahl | 74/552 X |
| 5,070,742 | 12/1991 | Sakane et al. | 74/558 X |
| 5,085,097 | 2/1992 | Harata et al. | 74/552 |
| 5,097,720 | 3/1992 | Drefahl | 74/552 |

FOREIGN PATENT DOCUMENTS 2058694  4/1981  United Kingdom .................. 74/552

Primary Examiner—Vinh T. Luong
Attorney, Agent, or Firm—Stephen E. Feldman

[57] ABSTRACT

A vehicle steering wheel armature comprises a steel hub adapted to be axially secured to a steering shaft and magnesium rim and rim support molded about and supported by said steel hub. The circular rim is in cross section downwardly U-shaped. The rim support has two arms—right and left—downwardly angled from the hub as viewed by an operator and integrating with the rim over a length along the rim. The hub is depressed below the rim and accommodates an air bag container. The arms are stepped to created at least two plane areas generally parallel to the plane of said rim, one of which attaches to said rim and the other providing a surface for the air bag container. Preferably, there is an angled flat bar at the plane of said rim connecting the two lower joinder points of said arms with said rim.

The preferred composition of the steering wheel is magnesium of at least ninety-three weight percent, aluminum of five percent with the balance containing some zinc, manganese and silicon.

Also the radius of the upper portion of the rim is greater than the lower portion and their diameters differ in the same manner.

5 Claims, 2 Drawing Sheets

STEERING WHEEL RIM

This is a continuation-in part of copending application Ser. No. 07/855,441 filed on Mar. 30, 1992.

FIELD OF THE INVENTION

This invention relates to a magnesium steering wheel armature for a vehicle, especially an automobile. It has a center portion adapted to hold an air bag container and is designed to collapse or break away in the event of an accident. It is characterized by its exceptionally light weight.

BACKGROUND OF THE INVENTION

An automobile steering wheel must satisfy certain requirements, such as minimizing or preventing vibration and providing for the safety of the driver in so far as possible. A wheel of low mass has a small amount of inertia which decreases the effect of road vibration and offers less resistance to turning. As to safety, desirably a steering wheel should deform, if necessary, upon driver impact during an accident absorbing the energy of the driver's body over a longer period of time, than would be the case if the wheel were rigid. Desirably, the wheel will tilt with the lower portion moving back and the upper portion relatively moving forward to offer a broader area for support of the driver's body if the protection afforded by the air bag is not sufficient, and also to tilt the section holding the air bag to deploy the air bag in a more desirable position. In extreme cases the wheel should break away.

Many designs and constructions for steering wheels have been proposed in the past. [See, for example, U.S. Pat. No. 4,920,821, shinto et al, and the numerous references cited therein.] However, there is still room for improvement, especially in making a lightweight wheel that is energy absorbing, but functionally strong enough to achieve its desired purpose.

SUMMARY OF THE INVENTION

This invention is a steering wheel armature or core having a rim supported by two arms downwardly dependant from the hub, with the hub portion being recessed to accept an air bag container. The arms are designed to collapse or break away if hit forcibly enough with the body of the driver. The steering wheel armature is made specifically of a magnesium-/aluminum injectable molding composition that gives the wheel exceptional light weight yet sufficient strength. The radius of the rim of the wheel at its upper portion is greater than at its lower portion and their diameters differ so that the lower portion has a smaller diameter making it thinner and weaker. Also the rim of the wheel, as viewed by the driver, is downwardly U-shaped; i.e., concave on its underside, which further reduces the weight of the armature.

In brief, this invention is directed to a vehicle steering wheel armature that has a steel hub to be secured to the steering shaft and a magnesium rim and rim support cast about and supported by the hub. The rim is generally circular and is adapted to be grasped by the hand. Also the radius of the upper portion of the rim is greater than the lower portion and their diameters differ in the same manner. In cross section, it is downwardly U-shaped or concave. The rim support comprises two broad arms, right and left, downwardly angled from the vertical center line as viewed by the operator and integrating with the rim.

A steel hub is depressed and the arms are broadly joined thereabout creating a support surface to support an air bag container. Preferably, the arms are stepped to create in addition to the air bag support surface a plane area generally parallel to the plane of the rim which integrates or attaches to the rim.

Each arm is, in broad detail, the mirror image of the other and has a web approximately perpendicular to the plane of the rim along its lower or inside edge. Preferably, there is an angled bar at approximately the plane of the rim connecting the two lower juncture points of the arms with the rim, this angled bar being provided both for strength and for appearance.

The arms have openings or are perforate as necessary to receive instrument controls, such as horn buttons and to facilitate breaking away. In the center portion, the arms have retaining means to hold an air bag package over the hub.

The armature is preferably molded from a composition comprising at least ninety-three weight percent magnesium and an aluminum content of at least five percent with the balance having some zinc, manganese and silicon.

DRAWINGS

DESCRIPTION

Figure 1:
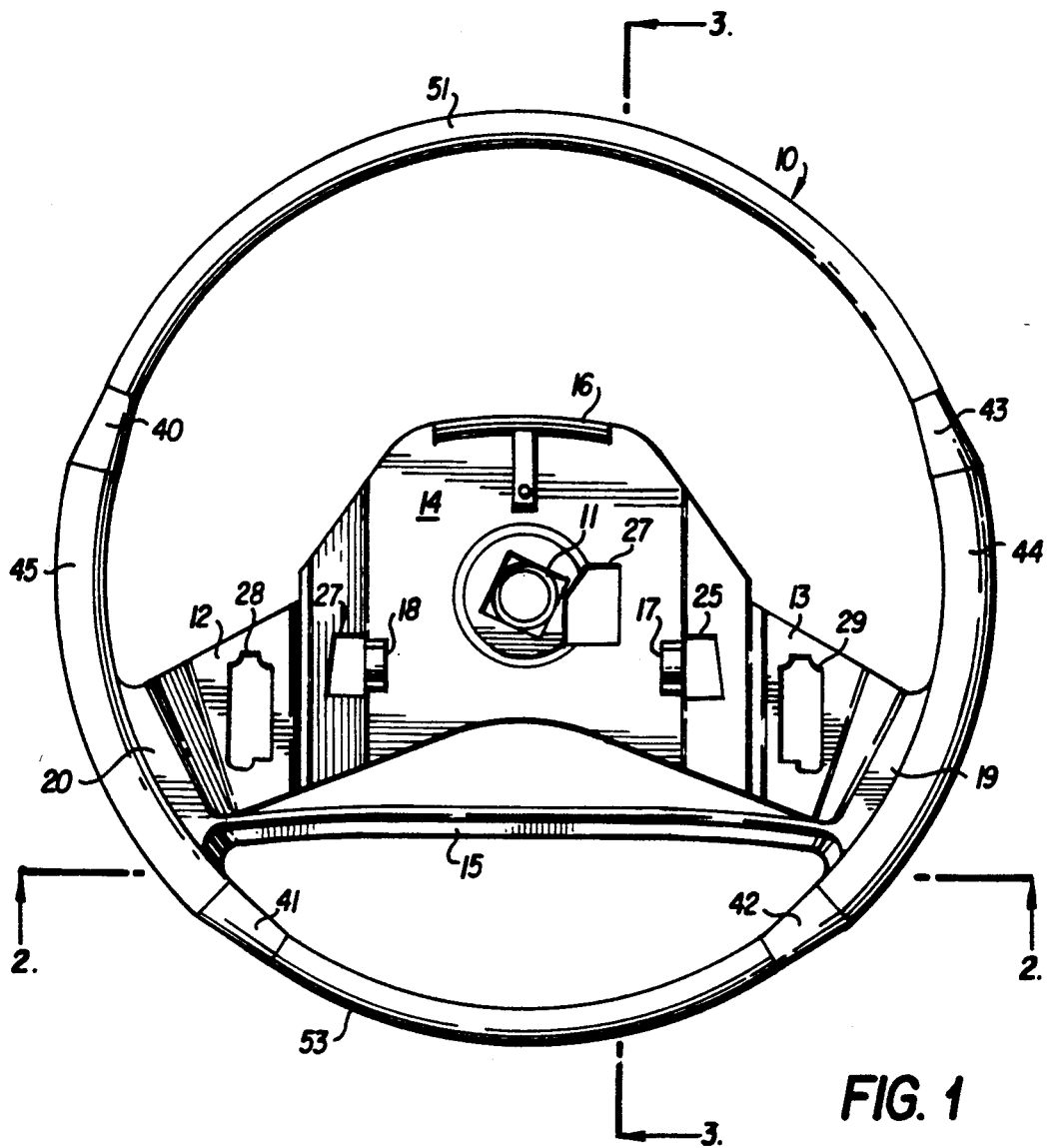
FIG. 1 is a top plane view from the position of the driver of the steering wheel armature of this invention.
Figure 2:
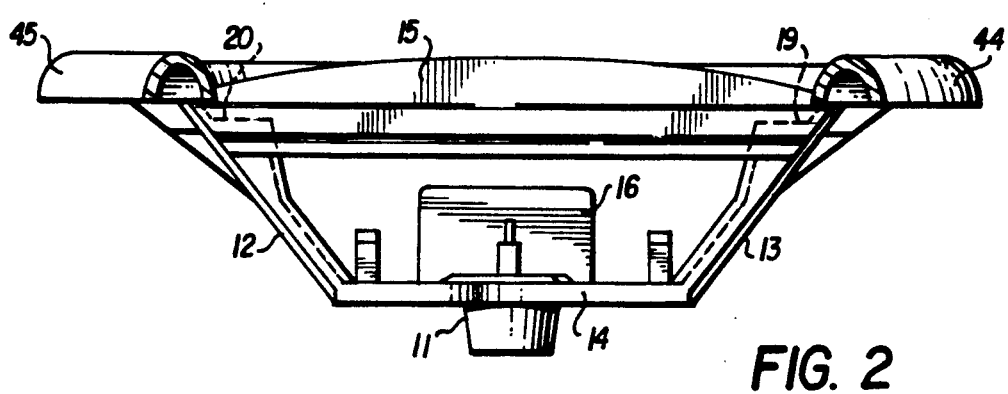
FIG. 2 is a sectional view of the armature taken along line 2—2 of FIG. 1.
Figure 3:
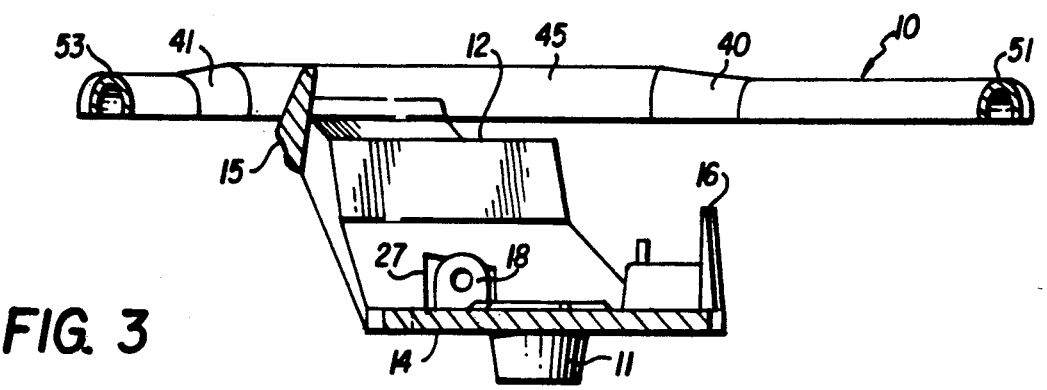
FIG. 3 is a sectional view taken along line 3—3 of FIG. 1.

Referring to the drawings, the steering wheel armature of this invention consists of a rim 10 supported by two arms 12 and 13 which from the viewpoint of the driver angle downwardly toward the center of the rim to a hub 11. The rim and the arms are die cast at one piece.

The arms 12 and 13 are broadly joined about the hub on a plane 14 parallel to the plane of the rim which provides support for an air bag container. The top surface of plane 14 is depressed from the plane of the rim. Consequently, the arms rise upwardly to join with the rim. Preferably, they are stepped, as shown, to provide the top plane surfaces 19 and 20 where the arms flow into the rim. The arms at any point preferably have a thickness in the range of three to six millimeters. From the viewpoint of the driver, the arms are angled down as shown in the range of twenty-five to thirty five degrees from the vertical center line.

For strength it is preferred that the steering wheel has a flat bar 15 curved on its top portion and being approximately at the plane of the rim. Bar 15 connects with arms 12 and 13 at their lower joinder points with the rim.

Surface 14 has a upwardly rising retaining member 16 and two lugs 17 and 18 adapted to receive an air bag container. In addition to these retaining means, the arms may have openings such as at 25, 26 and 27 for receiving instruments or controls such as horn switches, to permit assembly and to permit the passage of wires as may be necessary. Openings at 28 and 29 facilitate the breaking away of the wheel if hit hard enough.

As a further refinement, as illustrated, as the rim leaves the area of joinder of the arms, it may be tapered and reduced in cross sectional diameter as at 40, 41, 42 and 43 to further reduce the weight. The portions of the rim at 44 and 45 are larger in cross sectional diameter to provide the desired amount of strength. Furthermore, the rim 10, in cross section, is downwardly U-shaped on its back side.

Figure 4:
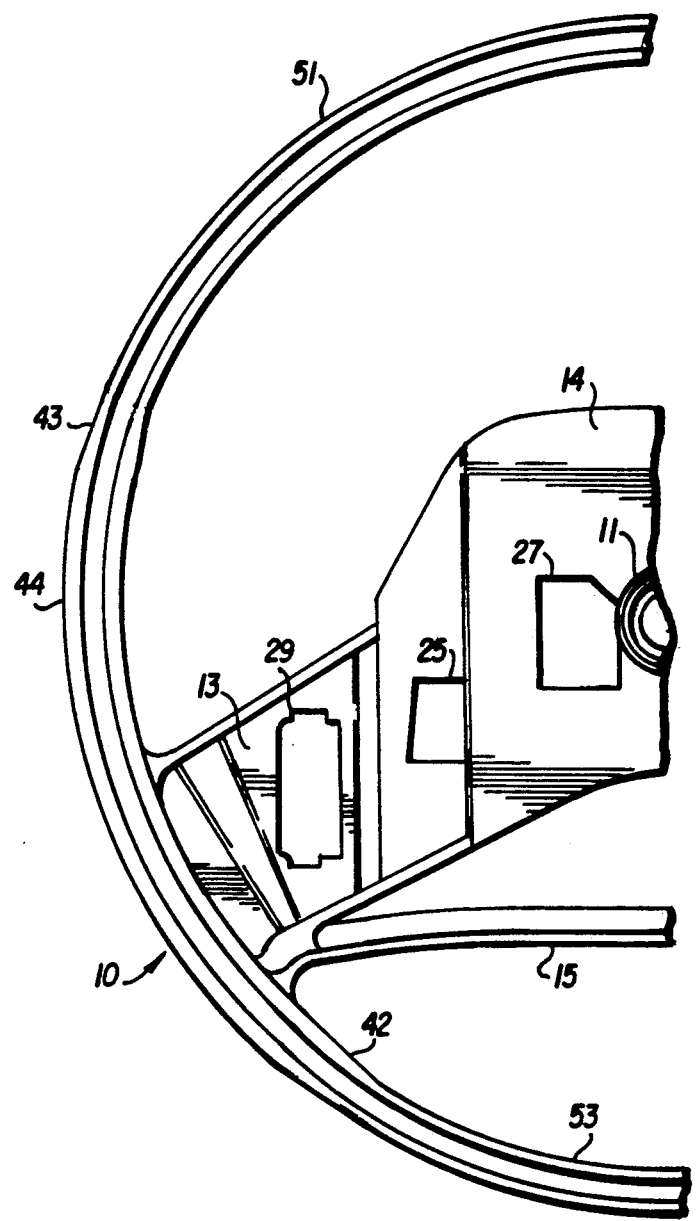
FIG. 4 is an enlarged top plan view of the left side of the armature of FIG. 1.

Additionally as seen best in FIG. 4 the rim 10 comprises upper and lower portions, 51 and 53, respectively, the radius of the upper portion 51 being greater than the lower portion 53; furthermore the diameter of the upper portion 51 of the rim 10 is greater than the diameter of the lower portion 53. Preferably the radius and diameter of the upper and lower portion, 51 and 53, are 6 7/8", ½" and 6 5/16", 7/16", respectively. Accordingly the lower portion 53 of the rim 10 is thinner.

The vehicle steering wheel armature is preferably cast of a metal having a magnesium content of at least ninety-three percent and a aluminum content of at least five percent with the balance having at least some zinc, manganese and silicon (AM60B composition). It has been found that this composition desirably yields a very low weight steering wheel of adequate strength and flexibility yet permits collapsing of the wheel with the design as illustrated from the bottom portion, if upon impact, the driver's body should be thrown against the wheel. The design of the air bag is such, however, that it should deploy before driver contact with the wheel occurs with the air bag following, being supported by the arms and being guided in part by cross member 15.

Rim 10 can have plastic or rubber molded about it to complete the steering wheel.

Also the radius of the upper portion of the rim is greater than the lower portion and their diameters differ in the same manner.

Upon impact the lower portion 53 of the rim 10 will be tilted away from the driver upon impact whereas the upper portion 51 will be pushed toward the driver. This will advantageously direct the path of the air bag as the lower portion 53 of the rim 10 is tilted downward so that the expansion of the inflating air bag is properly deployed to intercept the driver's body and so it is positioned to be in closer contact therein.

Having described this invention what is sought to be protected by Letters Patent is set forth in the following claims.

What is claimed is:

1. A vehicle steering wheel armature, comprising:
   a. a steel hub adapted to be axially secured to a steering shaft; and
   b. a one piece magnesium rim and rim support about and supported by said steel hub;
      i. said rim being generally circular and adapted to be grasped by the hand and being in cross section on the back side downwardly U-shaped;
      ii. said rim support having two broad arms—right and left—downwardly angled from said steel hub as viewed by an operator and integrating with said rim; and
      iii. said rim having an upper and lower portion, the radius of the upper portion being greater than the radius of the lower portion.

2. The vehicle steering wheel armature of claim 1 wherein said arms join at and broadly encompass said hub wherein each said arms in broad detail is the mirror image of the other from the center line of said hub.

3. The vehicle steering wheel armature of claim 2 wherein said rim and arms have a magnesium content of at least ninety-three weight percent and an aluminum content of at least five percent with the balance having at least some zinc, manganese and silicon.

4. The vehicle steering wheel armature of claim 2 wherein the other of said planes of said arms have openings to receive an instrument control and said arms have retaining means to hold an air bag package in the center portion thereof over said hub.

5. A vehicle steering wheel armature, comprising:
   a. a steel hub adapted to be axially secured to a steering shaft; and
   b. a one piece magnesium rim and rim support about and supported by said steel hub;
      i. said rim being generally circular and adapted to be grasped by the hand; and
      ii. said rim having an upper and a lower portion, the radius of the upper portion being less than the radius of the lower portion.

* * * * *